Patented Aug. 14, 1951

2,564,619

UNITED STATES PATENT OFFICE 2,564,619

METHOD FOR MIXING CONCRETE

William J. Anderson, West Hartford, Conn.

No Drawing. Application May 31, 1951,
Serial No. 229,271

4 Claims. (Cl. 106—98)

This invention is a continuation in part of my copending application Serial No. 118,459, filed September 28, 1949, and relates generally to a process of mixing concrete, and, more specifically, to a process employing Portland type cement as the bonding agent of the concrete. The cements herein referred to as "Portland type" include those both as typical Portland cement or Rosendale cement such as may be obtained by sintering and grinding of calcareous and argillaceous materials and natural rock or other natural cements capable of setting by reacting with water.

It is well known in the art that sand or fine aggregate used in making concrete bulks to a greater volume when handled as moist materials; the finer the material, the greater the bulking. As a consequence, the voids in the components must be compensate for the enlargement, with the result that more cement and water than is necessary for best results are required to fill these voids.

Little consideration has previously been given to the bulking of cement which, being a very fine granular material, will bulk even more than the coarser aggregates in the presence of water. Just as in the case of the sand, the voids in the cement are enlarged and a greater quantity of water is used than is necessary to attain hydration of the cement particles.

Heretofore, sand, gravel or stone and cement, all of varying degrees of moisture and bulking properties, have been simultaneously dumped into a mixer and water added. Naturally, all the aggregates bulk. Each aggregate takes a portion of the water with the result that more water is used than is necessary to accomplish the hydration of the cement, and results in a concrete product of an inferior quality. The excess water, if left in the concrete, makes it susceptible to damage caused by freezing, as water expands and occupies more space when it is frozen. Also, the concrete is more porous due to the excess water, has less compressive strength and is less durable.

There are devices which make possible the removal of part of the excess water, but the result is uncertain and the process tedious and time-consuming, since it has to be applied to thin sections or layers as the concrete is being placed.

It is, therefore, the principal object of this invention to determine required quantities of coarse aggregate, sand, cement and water by the voids present in the various aggregates.

Another object of this invention is the provision of a process for mixing concrete which will substantially reduce bulking of the materials, from the greater volume, caused by the surface moisture present in these substances.

A further object of the invention is the use of a minimum amount of water so that there is no excess which need be drained off or which would lessen the compressive strength of the concrete in accordance with Abram's law (the compressive strength of concrete varies directly with the water-cement ratio).

This invention proposes controlled bulking by first drying the ingredients, more particularly the sand, by exposing the same to heat or other media in order to dry the same to a surface dry condition. Thus, natural sands containing more than 2%, generally more than 4%, of moisture have a bulk volume which varies from 130% to 150% of the normal bulk of the surface dry sand hereof. The surface dry sand is one which has been dried to contain less than 2% of free moisture, and preferably and normally less than 1% of free moisture. It will be understood that of the two types of moisture, free moisture, i. e., total moisture which includes not only the moisture adhering to the surface of the sand grains, but also the moisture in cracks, crevices and normal imperfections, as well as surface moisture, it is the surface moisture which contributes largely to the bulking effect and with which the present invention is primarily concerned. Free moisture, however, is readily measured, hence moisture quantities are herein given in both terms. A surface dry sand would generally contain on the surface less than ⅕ of 1% and often less than 1/10 of 1% where it has been extensively dried. In general, where the free moisture has been reduced to less than about 2% the sand will have considerably reduced bulking, generally of the order of less than 25%, and where the free moisture is less than about 1% the bulking is reduced to less than about 18%. Thus, whatever the surface moisture condition of the sand where less than the stated maximum of free moisture is present the sand will have markedly reduced bulk as compared to ordinary sands, but as stated, where the surface moisture is less than ⅕ of 1% there is substantially no bulking due to the presence of moisture. It, accordingly, will be understood that the surface dry sand hereof is not only free flowing, but contains substantially no water in a form capable of substantially increasing the normal bulk thereof.

Secondly, the addition of water solely to the cement prevents bulking of the sand or fine aggregate, which is kept in a surface dry condition until mixed with the cement paste.

Thirdly, the limited amount of water added, which is only slightly in excess of that required to hydrate the cement, provides increased compressive strength due to low water-cement ratio, greater density and practical elimination of all bulking. The cement-paste in this form is empirically of a relatively stiff plastic mix as distinguished from a highly fluid slurry with a minimum of bulking.

The present invention proposes a simple and rapid method of determining the amount of water required to fill only the voids in the cement, the amount of cement required to fill the voids in the sand or fine aggregate and the amount of sand required to fill the voids in the coarse aggregate.

The following steps are followed to provide twenty-seven cubic feet or one cubic yard of concrete:

(1) Obtain by test the apparent or bulk specific gravity of all of the materials, water being taken as 1.00;

(2) From the apparent specific gravity, calculate the weight at absolute volume of one cubic foot of each of the ingredients. This is found for each by multiplying the apparent specific gravity by 62.4 pounds, the weight of one cubic foot of water;

(3) Determine the percentage of voids in each aggregate. This consists in subtracting the actual weight per cubic foot from the weight per cubic foot at absolute volume (62.4 times the apparent specific gravity) and dividing the difference by the weight per cubic foot at absolute volume, and multiplying the result by 100.

(4) From the percentage of voids found in the material, calculate the weight of a cubic foot of surface dry material, loose measure. This will be found by multiplying the weight at absolute volume by (100% minus the percentage of voids);

(5) The quantity of coarse aggregate (e. g. stone, gravel, slag, etc.) measured in cubic feet absolute volume, to be used equals twenty-seven cubic feet times the percentage of the solid matter in the aggregate (100% minus the percentage of voids in the aggregate);

(6) The quantity of sand, in cubic feet absolute volume, to be used equals twenty-seven cubic feet times the percentage of voids in the coarse aggregate times the percentage of solid matter in the sand (100% minus the percentage of voids in the sand);

(7) The quantity of cement, in cubic feet absolute volume, to be used equals twenty-seven cubic feet times the percentage of voids in the coarse aggregate times the percentage of solid matter in the cement (100% minus the percentage of voids in the cement);

(8) The quantity of water, in cubic feet, to be used equals twenty-seven cubic feet times the percentage of voids in the coarse aggregate times the percentage of voids in the sand times the percentage of voids in the cement;

(9) The sum of the absolute volumes found in the last four steps must equal twenty-seven cubic feet;

(10) To arrive at the weights of the various materials to make twenty-seven cubic feet of concrete, multiply the absolute volume of each ingredient in cubic feet absolute volume by the weight per cubic foot at absolute volume, see Step (3) supra;

(11) The weight of cement found divided by 94 pounds, the weight of one bag of cement, equals the number of bags of cement to be used;

(12) The weight of water found divided by 8.33 pounds, the weight of one gallon of water, equals the number of gallons of water to be used;

(13) The weight of sand in pounds divided by the number of bags of cement equals the sand-cement ratio. This should equal 0.95 cubic feet, the loose volume in one bag of cement, divided by the percent of voids in the sand, multiplied by the weight of sand per cubic foot loose measure, found in Step (4), and

(14) The number of gallons of water found in Step (12) divided by the number of bags of cement equals the water-cement ratio, expressed as gallons per bag of cement, or this ratio can also be expressed by dividing the weight of water found in (12) by the weight of cement found in (11) in which case the water-cement ratio is a decimal and represents weight of water to weight of cement.

In practice, the quantities of sand, in a surface dry condition, coarse aggregate, cement and water are determined as above. Next, the surface moisture is removed from the sand and coarse aggregate. In the case of the sand, as pointed out above, the sand will be dried carefully to a surface dry condition wherein the sand has less than 2% of free moisture, and normally and preferably has less than 1% of free moisture, the dry sand surface having less than 1/3% of surface moisture. Then the water and cement are mixed thoroughly. Finally, the water-cement paste is added to the surface dry fine and coarse aggregates (or vice-versa) and mixed.

The concrete produced is definitely of superior quality to that heretofore produced inasmuch as it is resistant to freezing, denser, stronger and subsequently of greater durability.

While the invention has been described in detail, it is to be understood that only such limitations are to be imposed thereon as may reasonably come within the scope of the appended claims, as, for example, it is not absolutely necessary in order to obtain the objects of the invention, to use the maximum quanity of coarse aggregate indicated in (5) supra, provided the other ingredients are respectively proportionately increased, bearing in mind, however, that the greater the percentage of coarse aggregate used, within the limits shown in (5) the greater will be the compressive strength of the concrete (if the coarse aggregate used is of strong, durable material).

I claim:

1. The method of producing a plastic concrete mix comprising first mixing dry finely ground Portland type cement with a quantity of water sufficient only to fill the normal bulk voids between the dry cement particles and then mixing the water-cement paste thus formed with dry sand having a free moisture content of less than 2%, the quantity of water-cement paste being sufficient only to fill the normal bulk voids between the dry sand particles.

2. The method of producing a plastic concrete mix comprising first mixing dry finely ground Portland type cement with a quantity of water sufficient only to fill the normal bulk voids between the dry cement particles and then mixing the water-cement paste thus formed with surface dry sand to form a mortar, the surface dry sand having a free moisture content of less than 1%, the surface moisture of the sand grains being less than ⅕th of 1%, the quantity of cement paste being sufficient only to fill the normal bulk voids between the dry sand particles.

3. The method as defined in claim 1 wherein the plastic concrete mix further contains coarse aggregate.

4. The method as defined in claim 2 wherein the plastic concrete mix further contains coarse aggregate.

WILLIAM J. ANDERSON.

No references cited.

UNITED STATES PATENT OFFICE
CERTIFICATE OF CORRECTION

Patent No. 2,564,619

August 14, 1951

William J. Anderson

It is hereby certified that error appears in the printed specification of the above numbered patent requiring correction and that the said Letters Patent should read as corrected below.

Column 3, line 61, after "aggregate" insert --, times the percentage of voids in the sand,--.

Signed and sealed this 6th day of December 1955.

(SEAL)

Attest:

E. J. MURRY

Attesting Officer

ROBERT C. WATSON
Commissioner of Patents